(12) United States Patent
Shyu et al.

(10) Patent No.: US 9,405,405 B2
(45) Date of Patent: Aug. 2, 2016

(54) OPTICAL PROJECTION AND IMAGE SENSING APPARATUS

(71) Applicant: Young Optics Inc., Hsinchu (TW)

(72) Inventors: Jyh-Horng Shyu, Hsinchu (TW); Chu-Ming Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 16 days.

(21) Appl. No.: 14/608,167

(22) Filed: Jan. 28, 2015

(65) Prior Publication Data

US 2015/0138515 A1 May 21, 2015

Related U.S. Application Data

(63) Continuation of application No. 11/672,650, filed on Feb. 8, 2007, now abandoned.

(30) Foreign Application Priority Data

May 9, 2006 (TW) .............................. 95116328 A

(51) Int. Cl.
| | |
|---|---|
| H04N 9/31 | (2006.01) |
| G06F 3/042 | (2006.01) |
| G03B 21/26 | (2006.01) |
| G06F 3/03 | (2006.01) |

(52) U.S. Cl.
CPC .............. *G06F 3/0421* (2013.01); *G03B 21/26* (2013.01); *G06F 3/0304* (2013.01); *G06F 3/0425* (2013.01); *H04N 9/3102* (2013.01); *H04N 9/317* (2013.01); *H04N 9/3179* (2013.01); *H04N 9/3194* (2013.01); *H04N 9/3197* (2013.01)

(58) Field of Classification Search
CPC ...... G03B 21/26; G03B 21/28; G06F 3/0304; G06F 3/0421; G06F 3/0425; H04N 9/3179; H04N 9/3194
See application file for complete search history.

(56) References Cited

U.S. PATENT DOCUMENTS

| | | | | |
|---|---|---|---|---|
| 5,138,304 A | * | 8/1992 | Bronson | G06F 3/0386 345/157 |
| 5,502,514 A | * | 3/1996 | Vogeley | H04N 9/31 345/175 |
| 5,633,691 A | * | 5/1997 | Vogeley | G06F 3/0321 345/175 |
| 5,738,429 A | * | 4/1998 | Tagawa | G03B 21/132 353/122 |
| 5,805,243 A | * | 9/1998 | Hatano | H04N 9/312 348/E9.027 |
| 5,831,601 A | * | 11/1998 | Vogeley | G09G 3/346 178/18.01 |
| 5,967,636 A | * | 10/1999 | Stark | H04N 9/3129 348/743 |
| 6,260,973 B1 | * | 7/2001 | Minato | G03B 21/14 353/122 |
| 6,382,798 B1 | * | 5/2002 | Habraken | G02B 5/203 348/40 |

(Continued)

*Primary Examiner* — Bao-Luan Le
(74) *Attorney, Agent, or Firm* — Jianq Chyun IP Office

(57) ABSTRACT

An optical projection and image sensing apparatus including a light source, a light valve, a first lens set, a sensing module, and a beam splitter is provided. The light valve is used to convert an illumination light from the light source to an image light beam. The first lens set is used to project the image light to display an image on a screen, and the sensing module is used to sense a sensing light from the image on the screen. The beam splitter is disposed on the optical paths of the image light and the sensing light from the image on the screen. One of the sensing module and the light valve is disposed on the optical path of the sensing light passing through the beam splitter, and the other is disposed on optical path of the sensing light reflected by the beam splitter.

5 Claims, 11 Drawing Sheets

(56) References Cited

U.S. PATENT DOCUMENTS

| | | | |
|---|---|---|---|
| 6,416,185 B1* | 7/2002 | Smith | G03B 21/00 348/746 |
| 6,485,147 B2* | 11/2002 | Liang | G03B 21/53 353/101 |
| 6,530,666 B1* | 3/2003 | Smith | H04N 9/28 348/744 |
| 6,707,444 B1* | 3/2004 | Hendriks | G06F 3/0425 345/104 |
| 7,136,053 B2* | 11/2006 | Hendriks | G06F 3/0425 178/18.01 |
| 7,355,584 B2* | 4/2008 | Hendriks | G06F 3/0425 345/156 |
| 7,525,538 B2* | 4/2009 | Bathiche | G02B 5/282 345/175 |
| 7,557,341 B2* | 7/2009 | Chou | G03B 21/14 250/235 |
| 8,079,714 B2* | 12/2011 | Peng | G06F 3/0386 345/173 |
| 2002/0063852 A1* | 5/2002 | Liang | G02B 7/28 353/53 |
| 2003/0122780 A1* | 7/2003 | Hendriks | G06F 3/0425 345/156 |
| 2005/0162409 A1* | 7/2005 | Hendriks | G06F 3/0425 345/173 |
| 2006/0289760 A1* | 12/2006 | Bathiche | G02B 5/282 250/332 |
| 2007/0252086 A1* | 11/2007 | Chou | G03B 21/14 250/353 |
| 2010/0149436 A1* | 6/2010 | Peng | G06F 3/0386 348/745 |

\* cited by examiner

OPTICAL PROJECTION AND IMAGE SENSING APPARATUS

CROSS-REFERENCE TO RELATED APPLICATION

This is a continuation application of and claims priority benefit of patent application Ser. No. 11/672,650, filed on Feb. 8, 2007, which claims the priority benefit of Taiwan application Ser. No. 95116328, filed on May 9, 2006. The entirety of each of the above-mentioned patent applications is hereby incorporated by reference herein and made a part of this specification.

BACKGROUND OF THE INVENTION

1. Field of Invention

The present invention relates to an image display apparatus. More particularly, the present invention relates to an optical projection and image sensing apparatus.

2. Description of Related Art

FIG. 1A is a schematic perspective view of a conventional optical projection and image sensing apparatus, and FIG. 1B is a side view of the optical projection and image sensing apparatus of FIG. 1A. Referring to FIG. 1A and FIG. 1B, the conventional optical projection and image sensing apparatus 100 comprises a circuit board 110, an optical projection system 120, an image sensing system 130, and a screen 140. The optical projection system 120 and the image sensing system 130 are coupled to a circuit board 110. The optical projection system 120 is used to project an image light 122 to display an image on a screen 140. The image sensing system 130 comprises four charge coupled device (CCD) sensing modules 132, and each of the CCD sensing modules 132 is used to sense a quarter of the image on the screen 140.

Accordingly, when a user touches the screen 140, the image sensing system 130 senses the variation of the image on the screen 140, thus achieving the effect of the touch screen. Moreover, the image sensing system 130 records the variation of the image on the screen 140, such that the conventional optical projection and image sensing apparatus 100 records the data noted by the user on the screen 140 in real time.

However, in the conventional optical projection and image sensing apparatus 100, since the optical projection system 120 and the image sensing system 130 are separated, the devices (e.g. lens set) in the optical projection system 120 and the image sensing system 130 cannot be shared, it is difficult to save the manufacturing cost. Moreover, in the conventional art, four CCD sensing modules 132 are required to sense the image on the whole screen 140. Thus, the cost of the image sensing system 130 is increased and also the correction of the matching of the four CCD sensing modules 132 is required, thereby increasing the complexity of design and manufacture.

SUMMARY OF THE INVENTION

Accordingly, an objective of the present invention is to provide an optical projection and image sensing apparatus, so as to reduce the manufacturing cost.

Other objectives, features and advantages of the present invention will be further understood from the further technology features disclosed by the present invention wherein there are shown and described preferred embodiments of this invention, simply by way of illustration of modes best suited to carry out the invention.

In order to achieve the above or other objectives, the present invention provides an optical projection and image sensing apparatus, suitable for projecting an image light to display an image on a screen and sensing a sensing light from the image on the screen. The optical projection apparatus comprises a light source, a light valve, a first lens set, a sensing module, and a beam splitter. The light source is used to provide an illumination light. The light valve is disposed on the optical path of the illumination light for converting the illumination light to the image light. The first lens set is disposed on the optical path of the image light for projecting the image light to display the image on the screen, and the sensing module is used to sense the sensing light from the image on the screen. The beam splitter is disposed on the optical path of the image light and the sensing light from the image on the screen. The beam splitter is used to reflect a part of the sensing light and allow a part of the sensing light to pass through. Moreover, one of the sensing module and the light valve is disposed on the optical path of the sensing light passing through the beam splitter, and the other is disposed on the optical path of the sensing light reflected by the beam splitter.

The present invention further provides an optical projection and image sensing apparatus, suitable for projecting an image light to display an image on a screen and sensing a sensing light from the image on the screen. The optical projection apparatus comprises a light source, a DMD, a first lens set, and a sensing module. The light source is used to provide an illumination light, and the DMD is disposed on the optical path of the illumination light. The DMD has a plurality of micro-minors respectively in ON state or OFF state. The micro-minors in ON state are used to convert the illumination light to the image light. Moreover, the first lens set is disposed on the optical path of the image light for projecting the image light to display the image on the screen. The sensing module is used to sense the sensing light from the image on the screen, and the sensing module is disposed on the optical path of the sensing light reflected by the micro-mirrors in OFF state.

When the optical projection and image sensing apparatus of the present invention projects the image and senses the image on the screen, a part of the devices can be shared, thus reducing the manufacturing cost. Moreover, since only one photosensitive device is required to sense the image on the screen, thus saving the manufacturing cost.

DESCRIPTION OF EMBODIMENTS

Figure 1A:
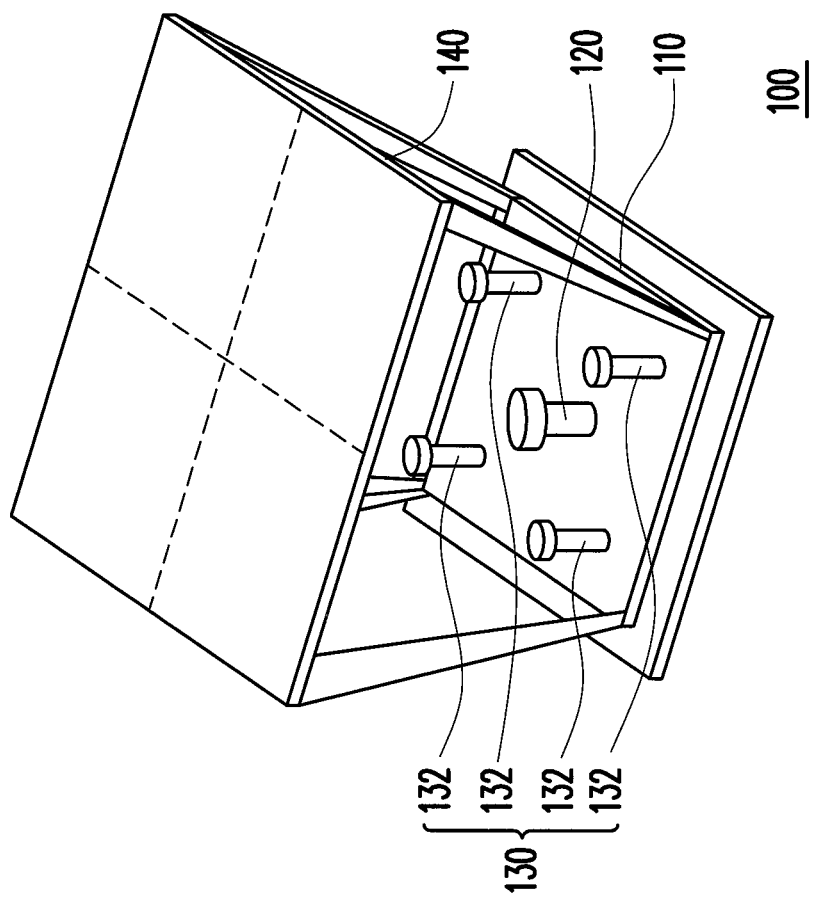
FIG. 1A is a schematic perspective view of a conventional optical projection and image sensing apparatus.
Figure 1B:
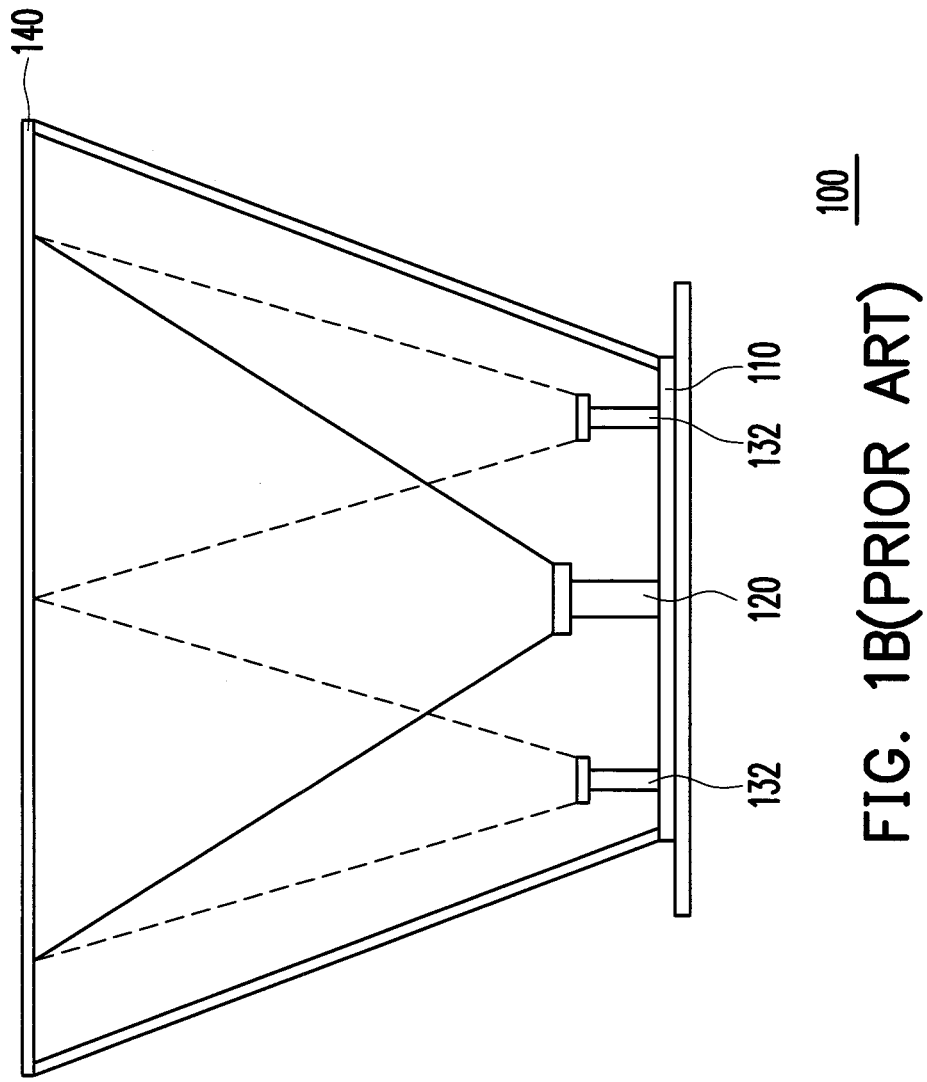
FIG. 1B is a side view of the optical projection and image sensing apparatus in FIG. 1A.
Figure 2:
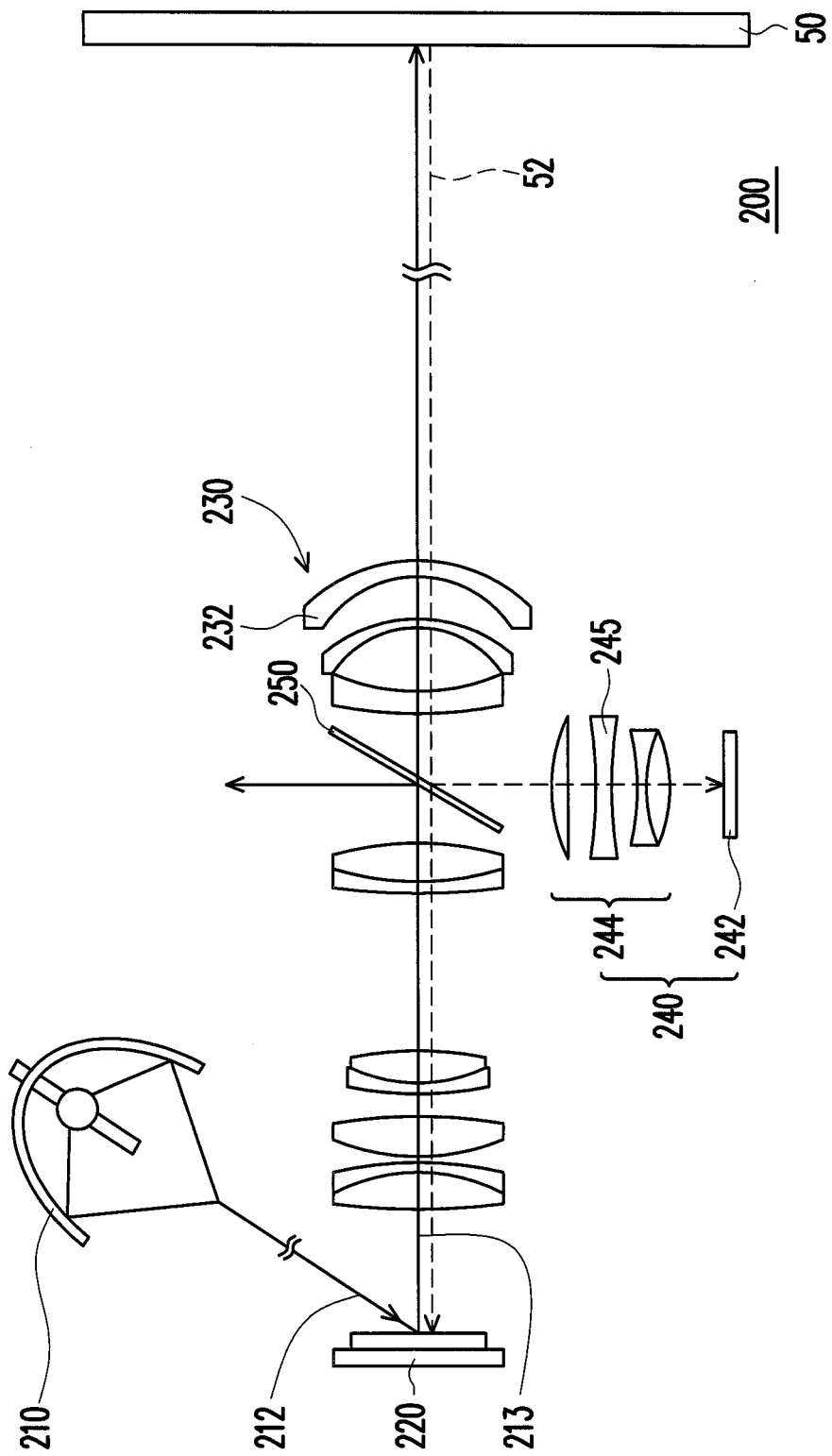
FIG. 2 is a schematic view of an optical projection and image sensing apparatus according to an embodiment of the present invention.

FIG. 2 is a schematic view of an optical projection and image sensing apparatus according to an embodiment of the present invention. Referring to FIG. 2, the optical projection and image sensing apparatus 200 of the present embodiment comprises a light source 210, a light valve 220, a first lens set 230, a sensing module 240, and a beam splitter 250. The light source 210 is used to provide an illumination light 212. The light valve 220 is disposed on the optical path of the illumination light 212, so as to convert the illumination light 212 to an image light 213. The first lens set 230 is disposed on the optical path of the image light 213 for projecting the image light 213 to display an image on a screen 50. The sensing module 240 is used to sense a sensing light from the image on the screen 50. The beam splitter 250 is disposed on the optical path of the image light 213 and the optical path of the sensing light 52. The beam splitter 250 is used to reflect a part of the sensing light and allow a part of the sensing light to pass through. Moreover, the light valve 220 is disposed on the optical path of the sensing light 52 passing through the beam splitter 250 and the sensing module 240 is disposed on the optical path of the sensing light 52 reflected by the beam splitter 250.

In the optical projection and image sensing apparatus 200, the light valve 220 is, for example, the reflective light valve or the transmissive light valve. The reflective light valve is, for example, a digital micro-mirror device (DMD), an LCOS panel, or the like, and the transmissive light valve is, for example, a transmissive liquid crystal panel. Moreover, the first lens set 230 comprises a plurality of lenses 232, and the beam splitter 250 is, for example, disposed between the lenses 232. The beam splitter 250 is a dichroic mirror, a neutral-density filter (ND filter), or the like, for example, allowing most of the image light 213 to pass through and reflect a small part of the sensing light 52. The image light 213 passing through the beam splitter 250 is projected to display the image on the screen 50. Since the beam splitter 250 allows most of the image light 213 to pass through, the brightness of the image on the screen 50 is not greatly affected.

The sensing module 240 is used to sense the variation of the image on the screen 50. Particularly, the sensing module 240 has a photosensitive device 242, and when the sensing light 52 from the image on the screen 50 is transmitted to the beam splitter 250, most of the sensing light 52 passes through the beam splitter 250, and a small part of the sensing light 52 is reflected to the photosensitive device 242 by the beam splitter 250 and is sensed by the photosensitive device 242. Since the photosensitive device 242 is relatively sensitive, even if the sensing light 52 transmitted to the photosensitive device 242 is relatively weak, the sensing light 52 still is effectively sensed. Therefore, when the user touches the screen 50, the photosensitive device 242 senses the variation of the sensing light 52 from the image on the screen 50, so as to achieve the effect of the touch screen. Moreover, the sensing module 240 can record the variation of the image sensed by the photosensitive device 242. In other words, when the user notes the data on the screen 50, the noted data can be recorded immediately.

In the present embodiment, the photosensitive device 242 is, for example, a CCD or a CMOS photosensitive device. Moreover, the photosensitive module 240 further comprises a second lens set 244 which comprises a plurality of lenses 245. The lenses 245 can be used together with the lenses 232 disposed between the beam splitter 250 and the screen 50 in the first lens set 230, serving as an image-capture lens set, so as to focus the sensing light 52 on the photosensitive device 242. Since a part of the lenses 232 in the first lens set 230 which serves as the project lens set can also be a part of the image-taking lens set, thus saving the cost of the lens. Also, compared with the conventional art, the optical projection and image sensing apparatus 200 of the present embodiment only needs a photosensitive device 242 to sense the sensing light 52 from the image on the screen 50. In this manner, not only the cost can be saved, but also the problem of the matching of the photosensitive device 242 can be solved. Therefore, the complexity of design and manufacture can be reduced, and the manufacturing cost of the optical projection and image sensing apparatus 200 of the present embodiment is relatively low.

Figure 3A:
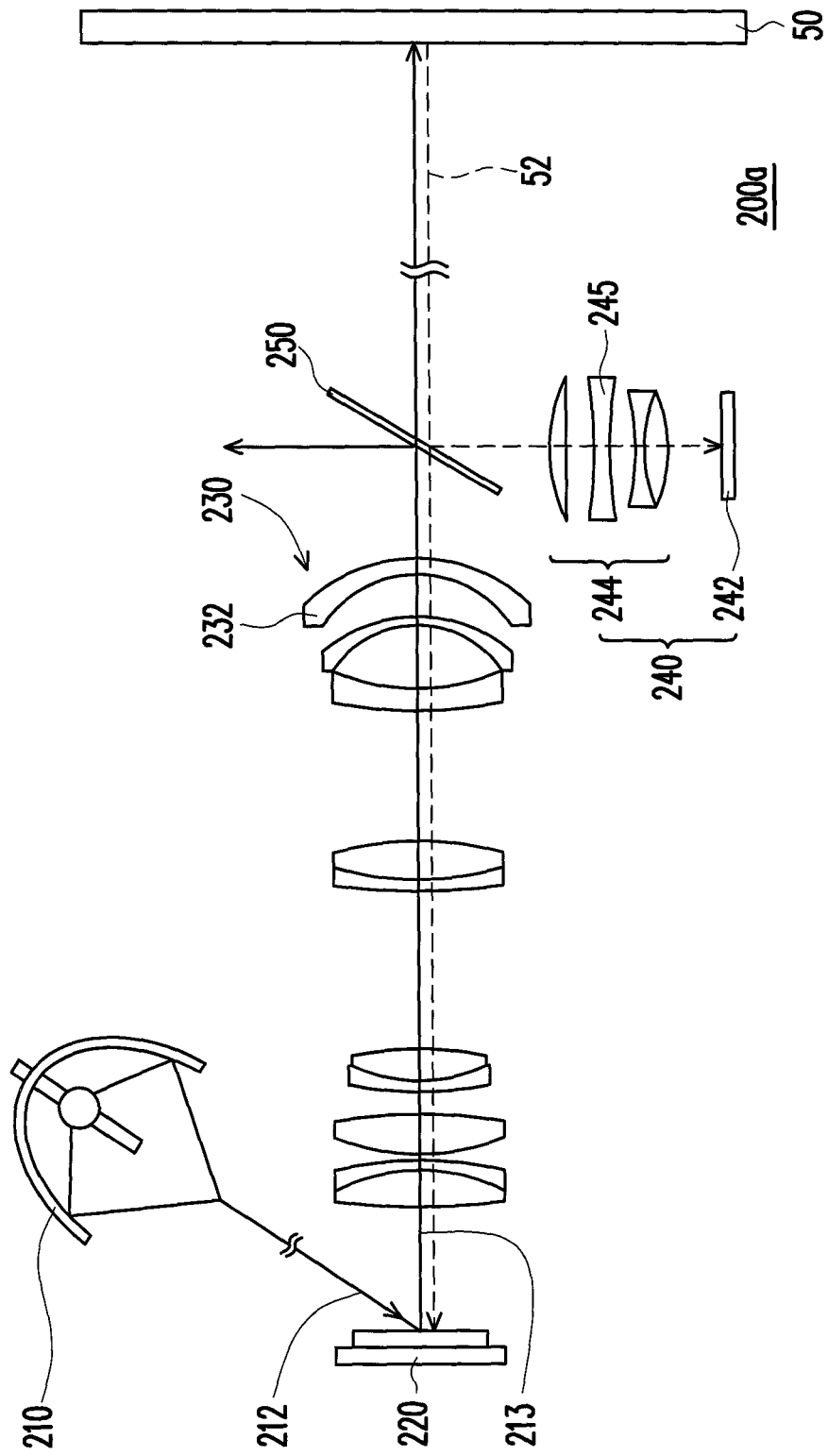
FIG. 3A to FIG. 3C are schematic views of the optical projection and image sensing apparatus according to another three embodiments of the present invention respectively.
Figure 3B:
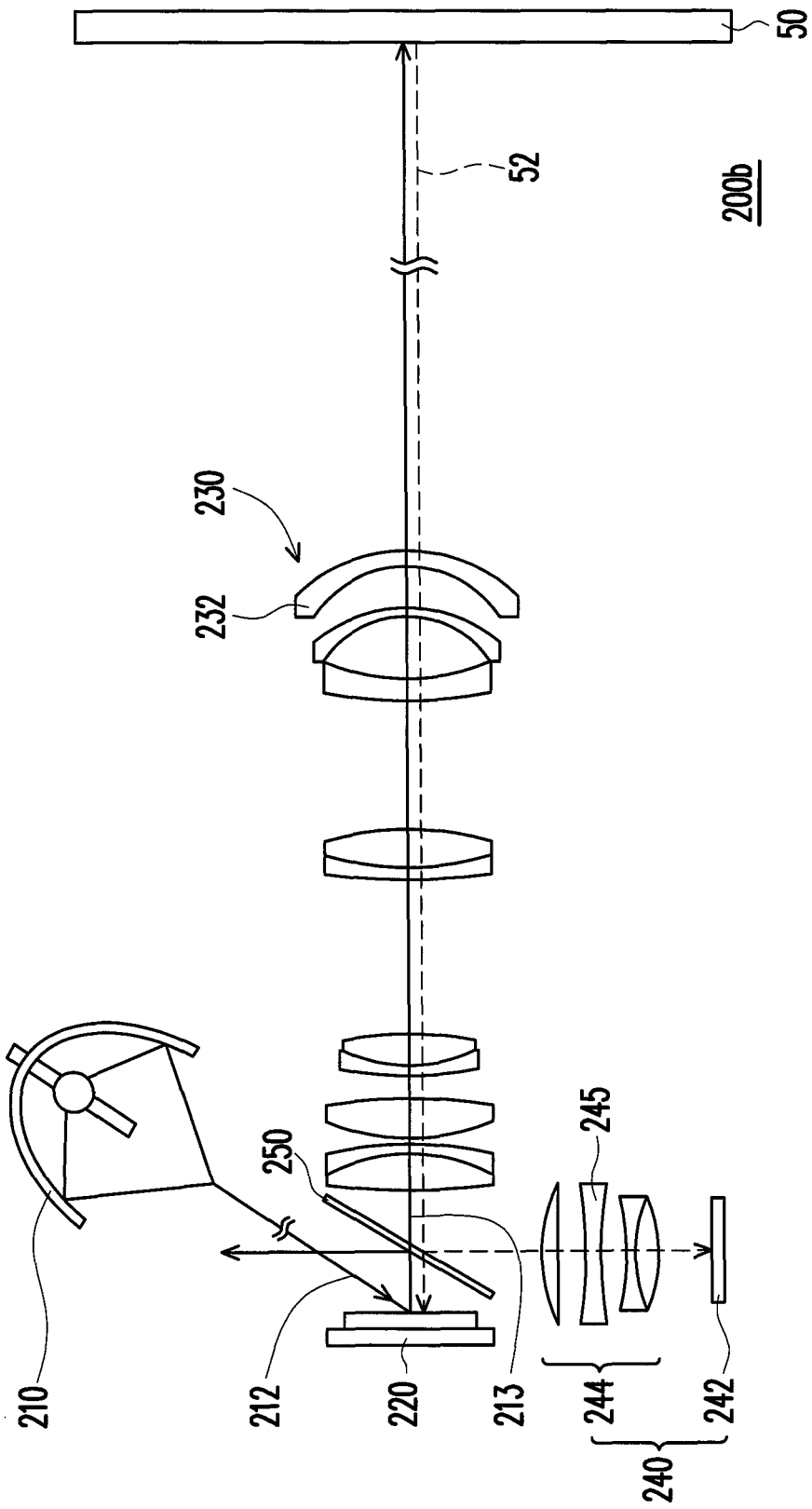
Figure 3C:
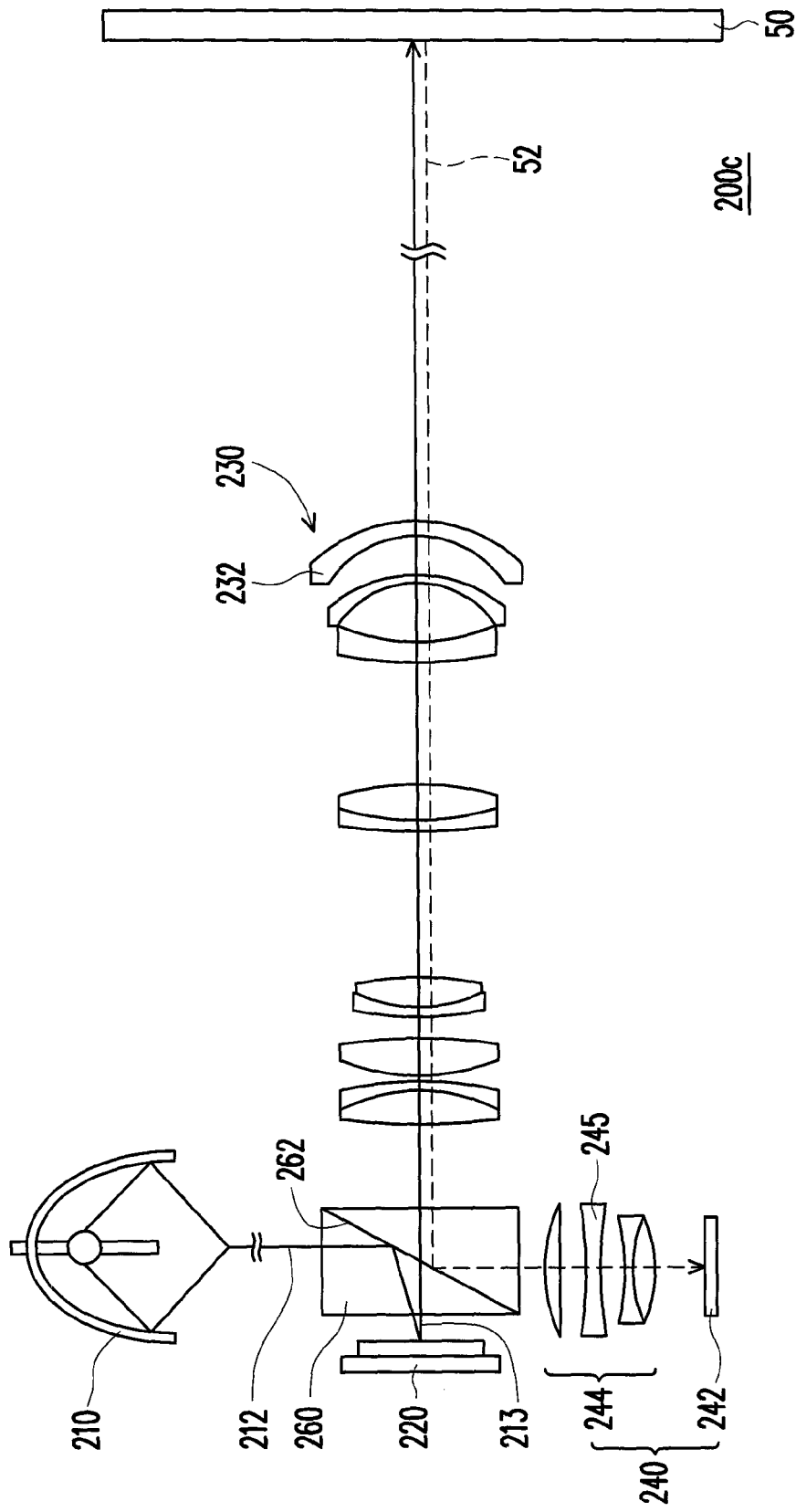

FIG. 3A to FIG. 3C are schematic views of the optical projection and image sensing apparatus according to three embodiments of the present invention respectively.

Referring to FIG. 3A and FIG. 3C, in the present invention, the beam splitter 250 can be, for example, disposed between the first lenses 232 as shown in FIG. 2, or disposed between the first lens set 230 and the screen 50 as shown in FIG. 3A, or disposed between the first lens set 230 and the light valve 220 as shown in FIG. 3B.

Moreover, in the optical projection and image sensing apparatus 200b, the positions of the sensing module 240 and the light valve 220 can be exchanged, while the position of the light source 210 is adjusted in accordance with the position of the light valve 220. The beam splitter 250 adopts the element which can reflect most of the light and allow a small part of the light to pass through.

In the embodiments of the present invention, in addition to the dichroic mirror or the ND filter serving as the beam splitter, the TIR prism 260 can be used as the beam splitter as shown in FIG. 3C. For example, a layer of the beam splitting film can be coated on the total reflection surface 262 of the TIR prism 260, such that most of the image light 213 and the sensing light 52 from the screen 50 can pass through, and a small part of the image light 213 and the sensing light 52 is reflected.

Figure 4A:
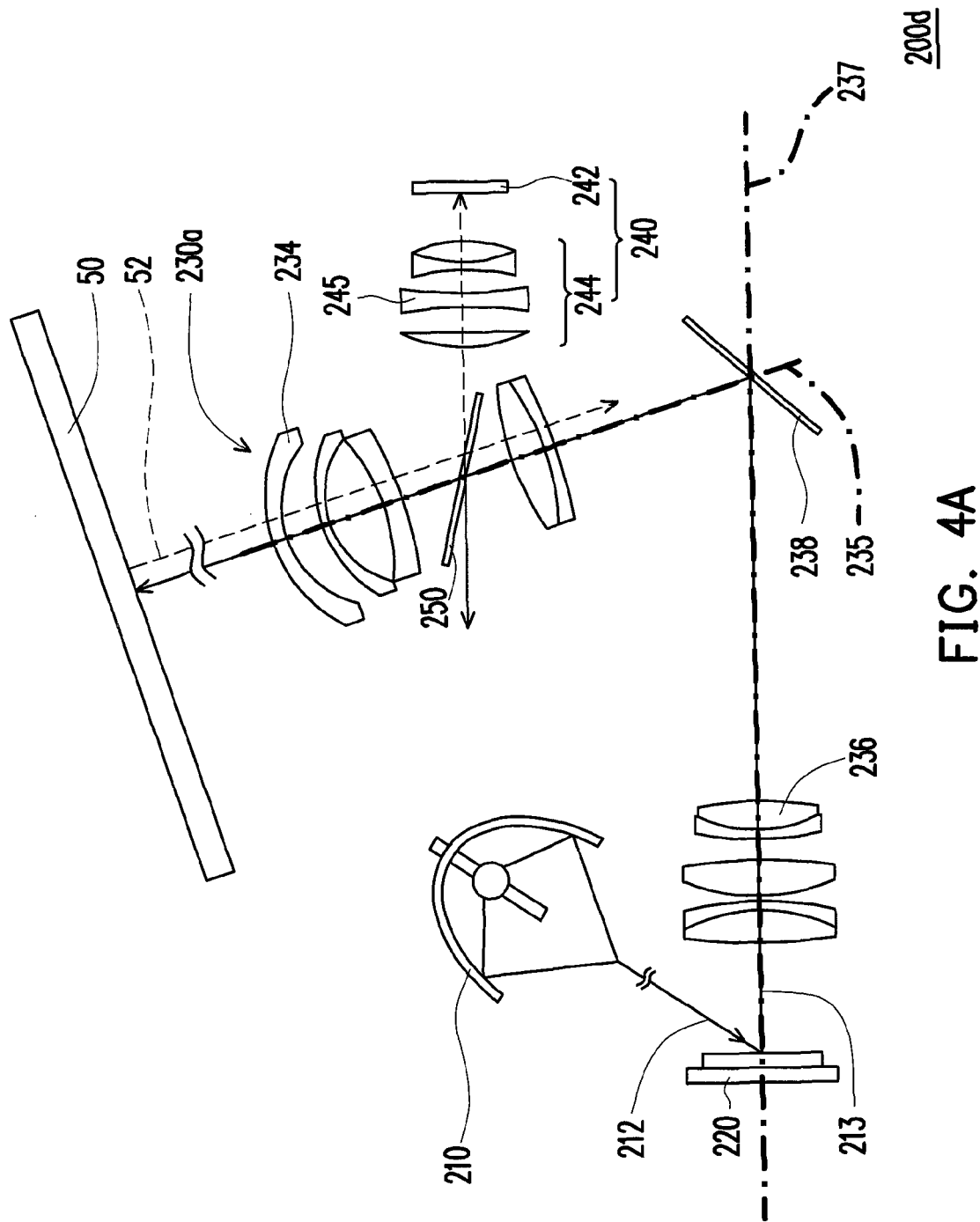
FIG. 4A and FIG. 4B are schematic views of the optical projection and image sensing apparatus according to another two embodiments of the present invention respectively.
Figure 4B:
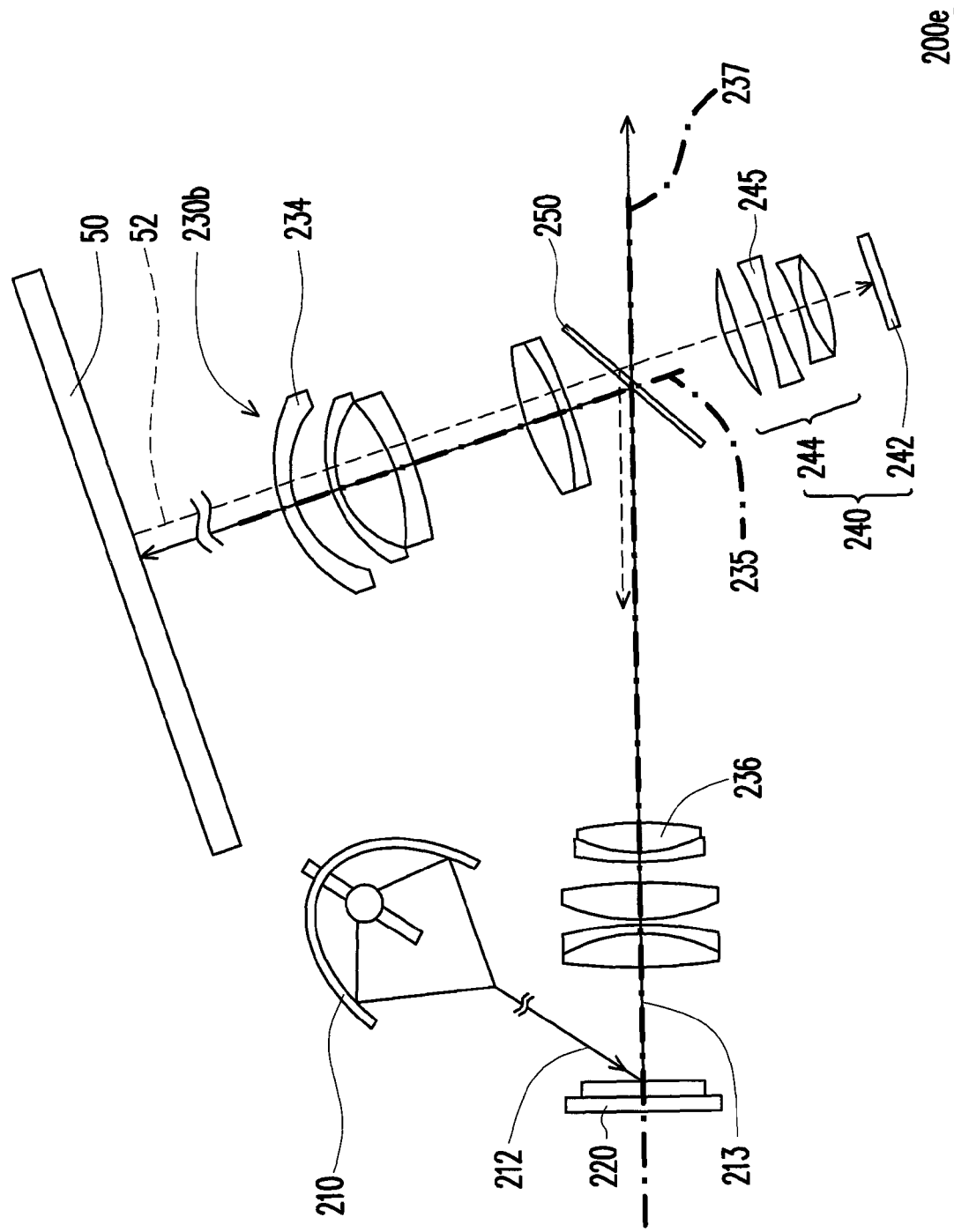

FIG. 4A and FIG. 4B are schematic views of the optical projection and image sensing apparatus according to another two embodiments of the present invention respectively. Referring to FIG. 4A, the optical projection and image sensing apparatus 200d in the present embodiment is similar to the optical projection and image sensing apparatus 200 as shown in FIG. 2, the difference is that the first lens set 230a of the optical projection and image sensing apparatus 200d comprises a plurality of first lenses 234, a plurality of second lenses 236, and a reflecting device 238. The central points of the first lenses 234 are connected to form a first optical axis 235. The second lenses 236 are disposed between the first lenses 234 and the light valve 220, as shown in FIG. 4A, and the central points of the second lenses 236 are connected to form a second optical axis 237. The first optical axis 235 intersects the second optical axis 237, and the reflecting device 238 is disposed at the intersection of the first optical axis 235 and the second optical axis 237. In addition to being disposed between the first lenses 234 as shown in FIG. 4A, the beam splitter 250 can be, in another embodiments, disposed between the first lens set 230a and the light valve 220, between the first lenses 234 and the reflecting device 238, between the second lenses 236 and the reflecting device 238, or between the second lenses 236.

Referring to FIG. 4B, in the optical projection and image sensing apparatus 200e, the first lens set 230b comprises a plurality of first lenses 234 and a plurality of second lenses 236, and the beam splitter 250 is disposed at the intersection of the first optical axis 235 and the second optical axis 237, so as to replace the reflecting device 238 in the optical projection and image sensing apparatus 200d. The beam splitter 250 can, for example, reflect most of the light, and allow a small part of the light to pass through. Moreover, the sensing module 240 is disposed on the optical path of the sensing light 52 passing through the beam splitter 250, and the light valve 220 is disposed on the optical path of the sensing light 52 reflected by the beam splitter 250.

Figure 5:
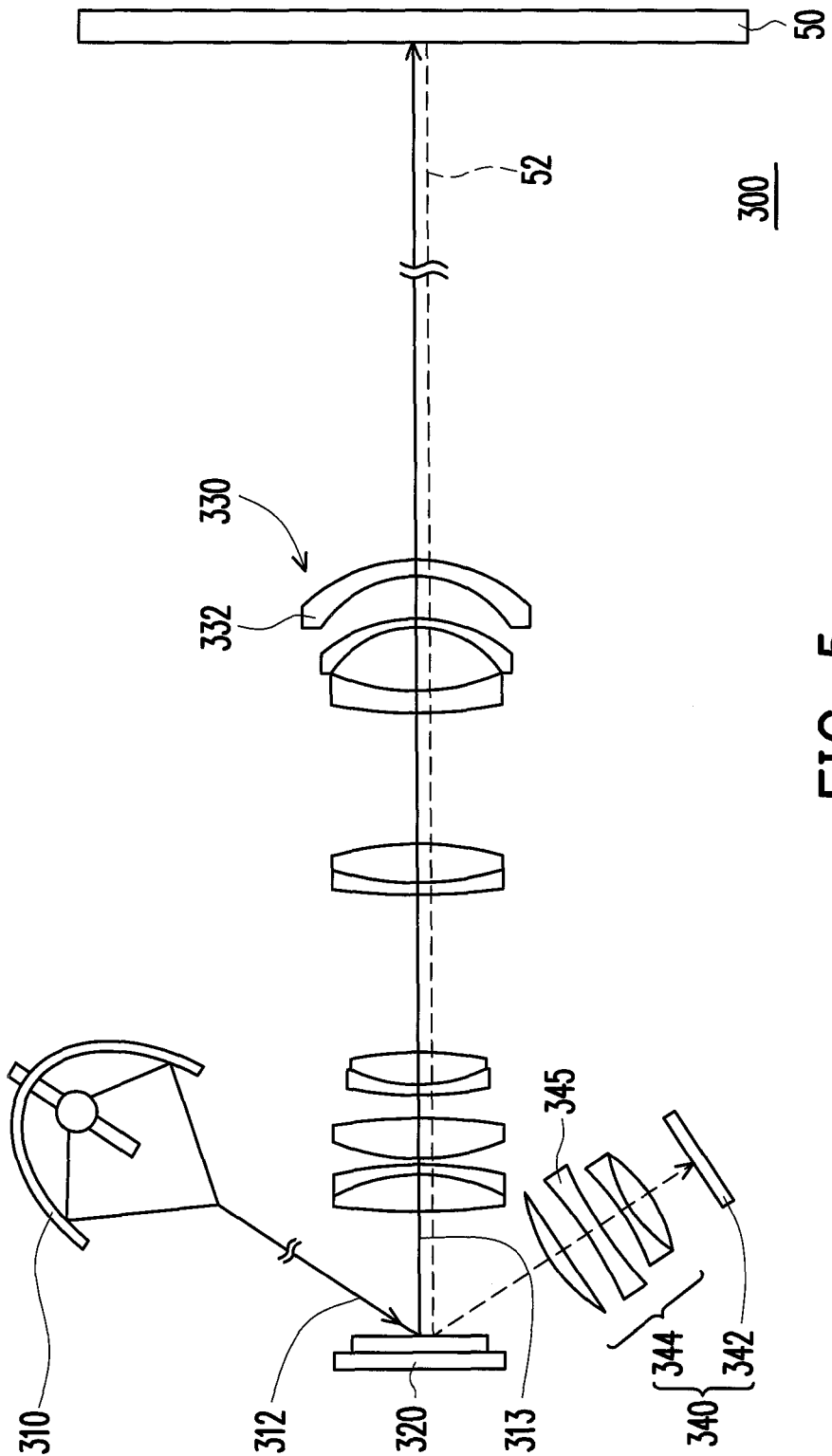
FIG. 5 is a schematic view of an optical projection and image sensing apparatus according to still another embodiment of the present invention.
Figure 6A:
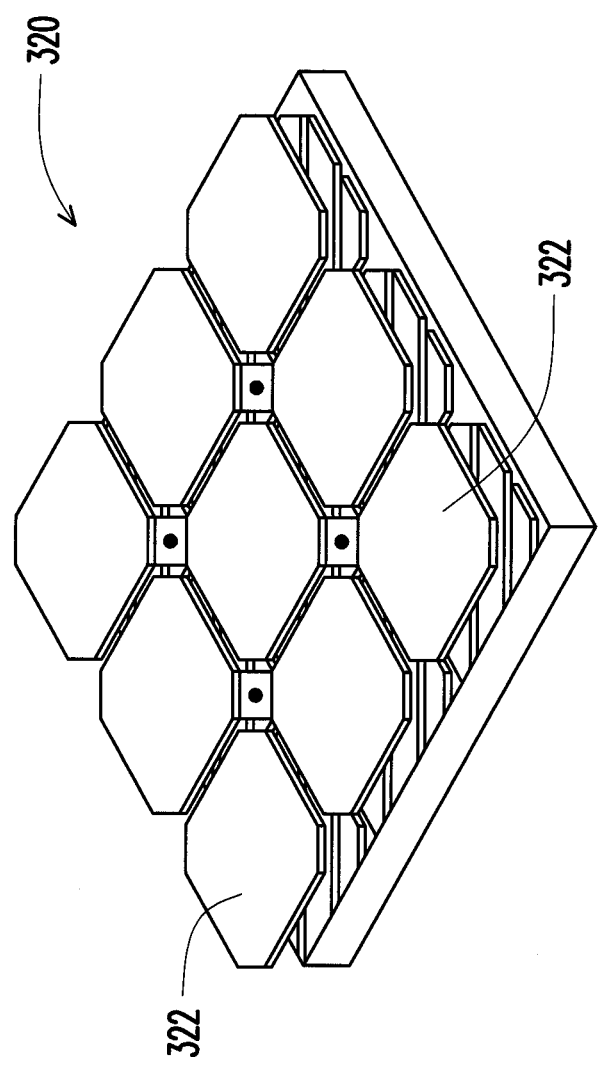
FIGS. 6A and 6B are schematic views of a digital micro-mirror device (DMD) according to the present invention.
Figure 6B:
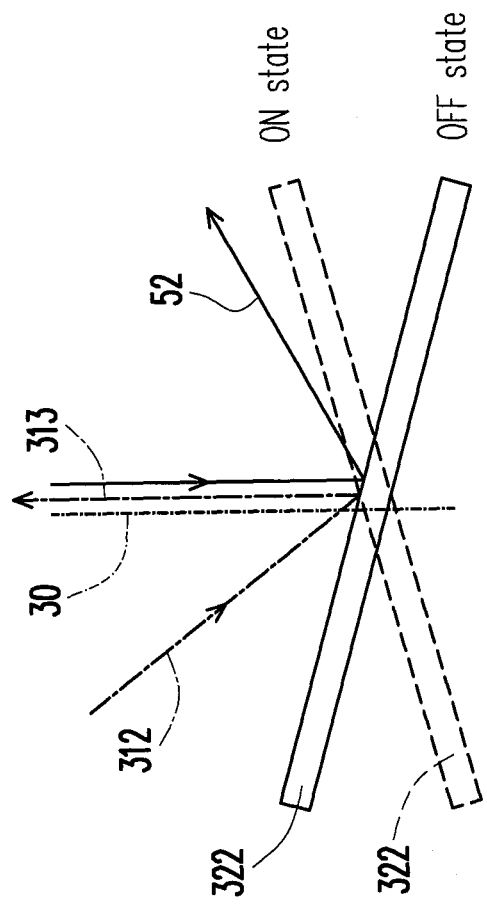

FIG. 5 is a schematic view of the optical projection and image sensing apparatus according to still another embodiment of the present invention. Referring to FIG. 5, the optical projection and image sensing apparatus 300 of the present embodiment comprises a light source 310, a DMD 320, a first lens set 330, and a sensing module 340. The light source 310 is used to provide an illumination light 312, and the DMD 320 is disposed on the optical path of the illumination light 312. The DMD 320 as shown in FIGS. 6A and 6B has a plurality of micro-mirrors 322. Each micro-mirror 322 has two inclination states (ON state and OFF state) centered on the axis 30. The micro-mirrors 322 in ON state are used to reflect the illumination light 312 to the first lens set 330 so as to convert the illumination light 312 to the image light 313. Moreover, the first lens set 330 is disposed on the optical path of the image light 313 for projecting the image light 313 to display the image on the screen 50. The sensing module 340 is used to sense the sensing light 52 from the image on the screen 50. Particularly, the sensing module 340 is disposed on the optical path of the sensing light 52 reflected by the micro-mirrors 322 in OFF state, so as to sense the image on the screen 50 and record the image on the screen 50.

The sensing module 340 comprises at least a photosensitive device 342. The photosensitive device 342 is, for example, a CCD or a CMOS photosensitive device. Moreover, the sensing module 340 can further comprise a second lens set 344 disposed between the photosensitive device 342 and the DMD 320. Since the optical projection and image sensing apparatus 300 according to the present invention does not need the beam splitter 250 as shown in FIG. 2, the manufacturing cost can be further reduced.

To sum up, the embodiments of the optical projection and image sensing apparatus has at least one of the following advantages.

1. When the optical projection and image sensing apparatus of the present invention displays the image and senses the image on the screen, a part of the devices can be shared, thus reducing the manufacturing cost.

2. The present invention only needs a photosensitive device to sense the image on the screen, the correction of the matching of the four CCD sensing modules 132 in the conventional art is not required, thus reducing the complexity of design and manufacture. Therefore, the manufacturing cost of the optical projection and image sensing apparatus of the present invention is relatively low.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical projection and image sensing apparatus for projecting an image light to display an image on a screen and sensing a variation of a sensing light from the image on the screen when a user touches the screen, the optical projection apparatus comprising:
   a light source, for providing an illumination light;
   a single light valve, disposed on an optical path of the illumination light, for converting the illumination light to the image light with multicolor;
   a first lens set, disposed on an optical path of the image light, for projecting the image light to display the image on the screen;
   a sensing module with at least one photosensitive device, for sensing the sensing light from the image on the screen, wherein the sensing light is visible light, wherein an angle between the image light emitted from the light valve and the sensing light striking onto the sensing module is not equal to 0 degree or 90 degrees; and
   a beam splitter, disposed on the optical path of the image light and the optical path of the sensing light, and between the light valve and the first lens set, the beam splitter being used to reflect the sensing light to the sensing module, wherein the sensing module is disposed on the optical path of the sensing light,
   wherein the at least one photosensitive device receives the sensing light that is the same as the variation of a sensing light from the image on the screen to achieve the effect of the user touching the screen, wherein the sensing light from the image on the screen is not focused back to the light valve, and the beam splitter is a total internal reflection prism.

2. The optical projection and image sensing apparatus as claimed in claim 1, wherein the sensing module further comprises a second lens set, disposed between the photosensitive device and the beam splitter.

3. The optical projection and image sensing apparatus as claimed in claim 1, wherein the photosensitive device comprises a charge coupled device (CCD) and a complementary metal oxide semiconductor (CMOS) photosensitive device, alternatively.

4. The optical projection and image sensing apparatus as claimed in claim 1, wherein the first lens set comprises:
   a plurality of first lenses, the central points of the first lenses being connected to form a first optical axis;
   a plurality of second lenses, disposed between the first lenses and the light valve, the central points of the second lenses being connected to form a second optical axis, and an extended line of the first optical axis intersecting an extended line of the second optical axis; and a reflecting device, disposed at the intersection of the extended line of the first optical axis and the extended line of the second optical axis.

5. The optical projection and image sensing apparatus as claimed in claim 1, wherein the light valve is selected from a group consisting of a digital micro-mirror device (DMD), a transmissive liquid crystal panel, and a liquid crystal on silicon panel (LCOS panel).

* * * * *